No. 663,870.  
Patented Dec. 18, 1900.
C. V. CUDLIPP.
DEVICE FOR DESTROYING FLIES.
(Application filed Aug. 9, 1900.)
(No Model.)
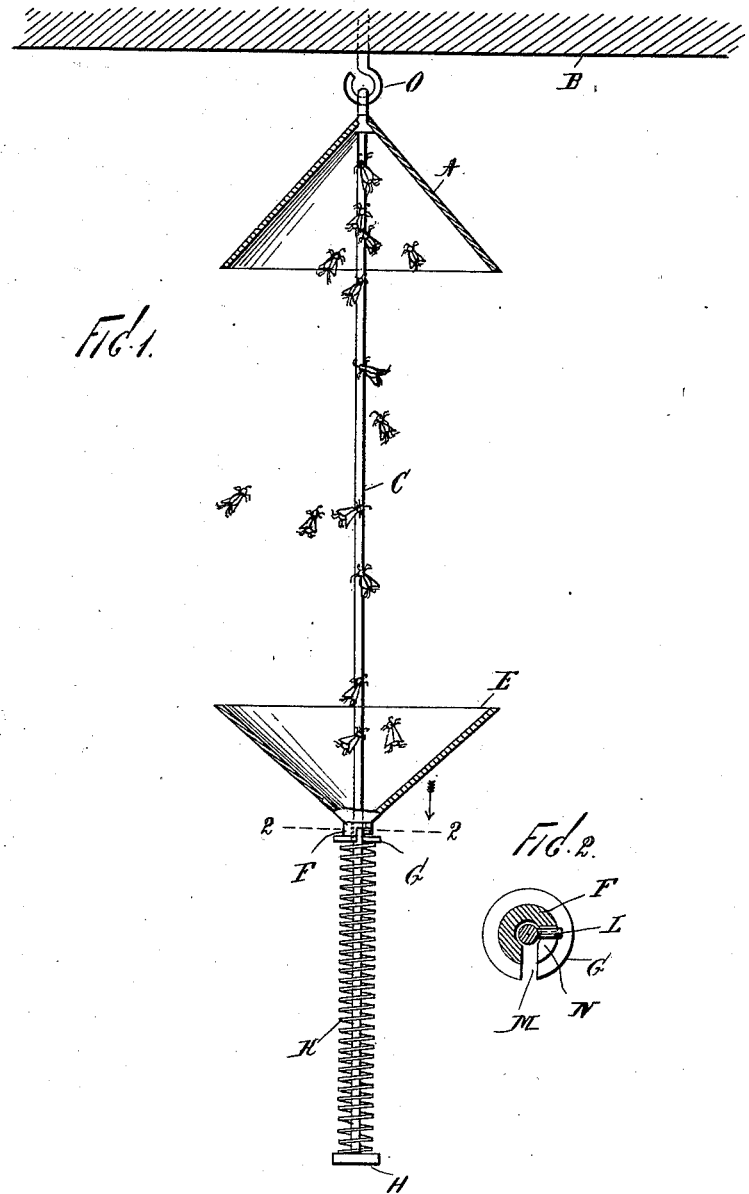

UNITED STATES PATENT OFFICE.

CARLOS VALENCIA CUDLIPP, OF LIMA, PERU.

DEVICE FOR DESTROYING FLIES.

SPECIFICATION forming part of Letters Patent No. 663,870, dated December 18, 1900.

Application filed August 9, 1900. Serial No. 26,327. (No model.)

*To all whom it may concern:*

Be it known that I, CARLOS VALENCIA CUDLIPP, a citizen of Peru, residing at Lima, Peru, have invented certain new and useful Improvements in Devices for Destroying Flies, of which the following is a full and complete specification, such as will enable those skilled in the art to which it appertains to make and use the same.

This invention relates to devices for destroying flies and other insects; and the object thereof is to provide an improved device of this class which is simple in construction and operation and well adapted to accomplish the result for which it is intended and which is also comparatively inexpensive.

The invention is fully disclosed in the following specification, of which the accompanying drawings form a part, in which the separate parts of my improvement are designated by the same letters of reference in each of the views, and in which—

Figure 1 is a sectional side view of the preferred form of the device which I employ, and Fig. 2 a transverse section on the line 2 2 of Fig. 1.

It is a well-known fact that flies and other insects are in the habit of collecting in the evening on elevated objects, such as the ceiling or devices suspended therefrom, and in the practice of my invention I provide a device which is adapted to be suspended from a ceiling or other support and which is designed to trap the flies and destroy the same.

In the drawings forming part of this specification I have shown the preferred form of apparatus or device which I employ, and this device consists of a bell A, which is adapted to be suspended from a ceiling B or other support and which is provided with a central depending rod C and on which is mounted a vertically-movable inverted-bell-shaped device E, provided at its downwardly-directed apex with a neck or sleeve F, at the lower end of which is a flange G. The lower end of the rod C is provided with a head H, and between the flange G of the neck F of the inverted-bell-shaped device E and the head H is a spiral spring K, which is designed to throw the inverted-bell-shaped device E upwardly into contact with the bell A.

In the normal position of the parts when the trap is not set the bell-shaped device E is in contact with the bell A and forms, in connection with the bell A, a closed chamber; but when the trap is set the bell-shaped device E is depressed against the operation of the spring K, and the rod C is provided with a pin L, which passes through a slot M in the flange G and neck F of the bell-shaped device E, and said bell-shaped device is adapted to turn through a partial revolution, so that the pin L will enter a horizontal segmental slot N in the neck F and hold the bell-shaped device E in the depressed position, as shown in Fig. 1. The rod E is connected with any desired substances which will attract the flies or other insects, and the flies or other insects will gather in large numbers thereon, and whenever it is desired to spring the trap the bell-shaped device E is partially turned, and the spring K at once throws said bell-shaped device upwardly into contact with the bell A, and the flies or other insects are trapped therein, and the device may be detached from the supporting-hook O, and the flies or other insects may be destroyed in hot water or in any desired manner.

The device may be used in the daytime as well as at night, as the coating of the rod C with sweetened material or substances will cause the flies to collect thereon; but it will be apparent that the device may be much more effectively operated in the evening or at night.

My invention is not limited to the exact construction herein shown and described, and any suitable automatic device may be employed for throwing the inverted-bell-shaped device upwardly into connection with the bell or other hollow device A.

Having fully described my invention, I claim as new and desire to secure by Letters Patent—

1. A fly-trap consisting of a hollow inverted device open at the bottom which is adapted to be suspended from a ceiling or other support, a central depending rod, and a vertically-movable inverted-bell-shaped device mounted thereon, and adapted to be thrown into contact with said first-named device, substantially as shown and described.

2. A fly-trap consisting of a hollow device open at the bottom and adapted to be suspended from a ceiling or other support, a central depending rod, a vertically-movable inverted-bell-shaped device mounted on said rod, a spring mounted between said last-named device and the lower end of said rod and adapted to throw said device upwardly, and means for holding said device in a depressed position against the operation of said spring, substantially as shown and described.

In testimony that I claim the foregoing as my invention I have signed my name, in presence of the subscribing witnesses, this 11th day of July, 1900.

CARLOS VALENCIA CUDLIPP.

Witnesses:
L. E. KIEFFER,
W. S. MCBRIDE.